United States Patent

[11] 3,571,604

| | | | | |
|---|---|---|---|---|
| [72] | Inventors | Brank C. La Porta<br>Livingston;<br>Paul W. Ussery, Middletown, N.J. | | |
| [21] | Appl. No. | 807,332 | | |
| [22] | Filed | Mar. 14, 1969 | | |
| [45] | Patented | Mar. 23, 1971 | | |
| [73] | Assignee | Bell Telephone Laboratories Incorporated<br>Murray Hill, N.J. | | |

[54] DUAL POLARITY VOLTAGE REGULATOR WITH TRACKING OUTPUTS
4 Claims, 1 Drawing Fig.

[52] U.S. Cl............................................. 307/24,
307/33, 307/55, 307/77, 323/22, 323/23
[51] Int. Cl...................................................... G05f 1/56
[50] Field of Search.......................................... 307/12, 18,
24, 33, 34, 52, 55, 77; 323/16, 19, 22 (T), 23, 25, 38

[56] References Cited
UNITED STATES PATENTS

| | | | |
|---|---|---|---|
| 2,772,387 | 11/1956 | Liguori......................... | 323/22(v) |
| 2,780,734 | 2/1957 | Gamble......................... | 307/34 |
| 3,414,802 | 12/1968 | Harrigan et al............... | 323/19X |

Primary Examiner—J. D. Miller
Assistant Examiner—A. D. Pellinen
Attorneys—R. J. Guenther and E. W. Adams, Jr.

ABSTRACT: A dual output voltage regulator supplying regulated voltages of identical magnitude and opposite polarity regulates the voltage of one polarity by comparison to a fixed reference voltage. The regulated voltage of the opposite polarity is regulated by detecting the voltage difference between the two regulated output voltages of opposite polarities and utilizing the voltage balance of the difference as a reference in regulating the voltage of the opposite polarity. The sensitivity of the regulator regulating the voltage of the opposite polarity is increased by using a differential error detector circuit energized by a constant current source.

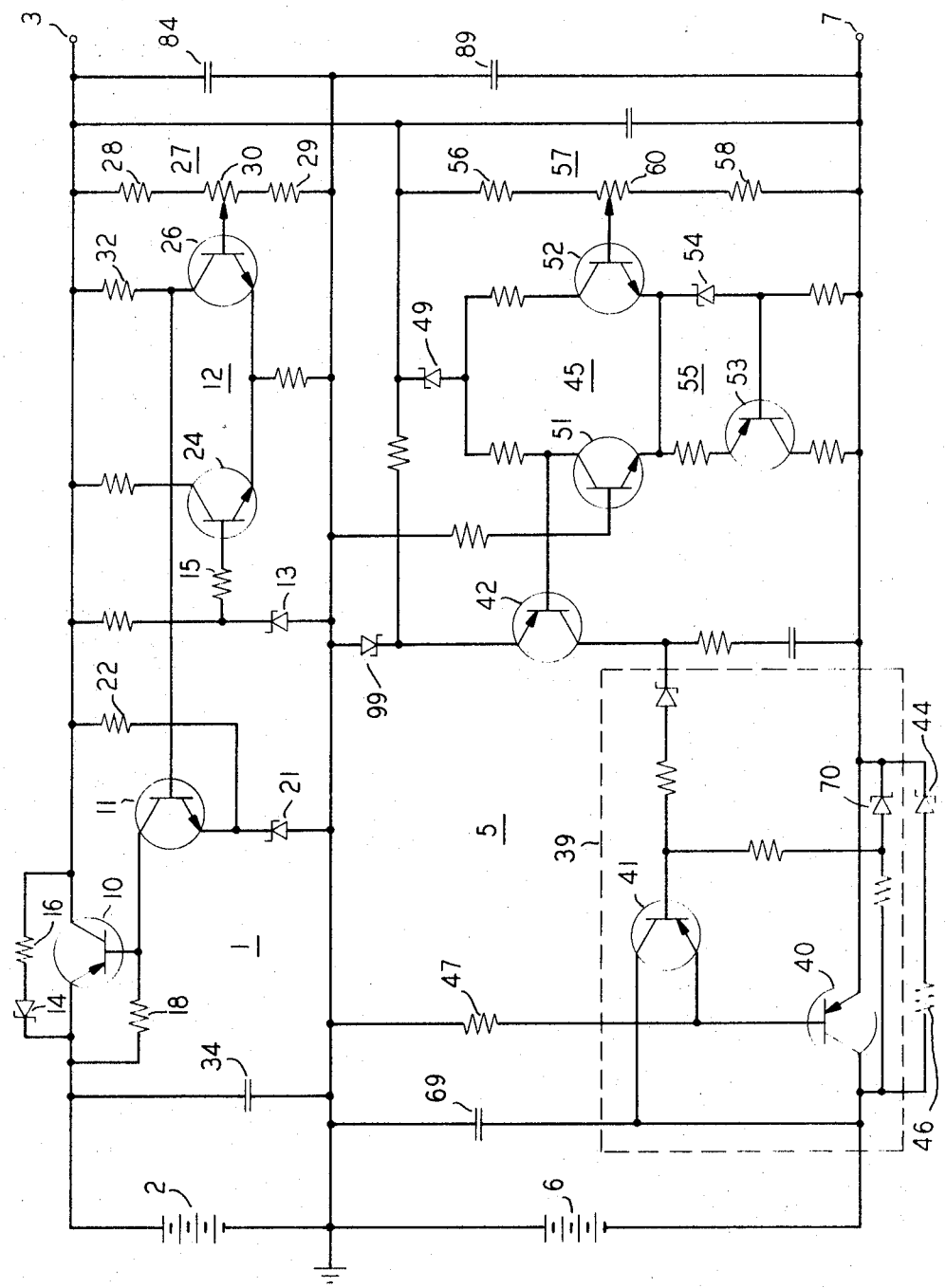
INVENTORS F.C. LaPORTA
P.W. USSERY
BY Alfred L. Steinmetz
ATTORNEY

DUAL POLARITY VOLTAGE REGULATOR WITH TRACKING OUTPUTS

FIELD OF THE INVENTION

This invention relates generally to voltage regulators and more particularly to voltage regulators supplying a plurality of voltage outputs of differing polarities.

BACKGROUND OF THE INVENTION

In some power supply applications, a plurality of regulated voltages of identical magnitude and opposite polarity are required. A typical example of such an application is in the energizing of cooperating encoder and decoder circuits which require very precise power signals continuously identical in magnitude and of opposite polarity. These precisely regulated power signals of opposite polarity are necessary to maintain identical standards of accuracy in both the encoding and decoding processes.

One method of regulating two voltages of identical magnitude and opposite polarity is to utilize oppositely poled Zener diodes in a dual output voltage regulator to regulate the two voltages. In order to achieve a high degree of accuracy with this type of voltage regulator, Zener diodes are required that have identical static and transient electrical characteristics. Such matching characteristics are difficult to secure at a reasonable price. Even if these identical electrical characteristics are attained, the Zener diodes may have differing thermal characteristics. Hence, the two Zener diodes may not drift in the same direction or by the same magnitude in response to thermal conditions. Another method of regulating two voltages of opposite polarity and identical magnitude is to utilize two very stable independent power supplies of opposite polarity. This too, however, is subject to the same cost limitations described above, with respect to the Zener diodes. This is due to the difficulty of designing identical characteristics into the two independent power supplies. The above-described voltage regulators additionally do not constrain the dual voltage outputs to track each other in magnitude.

It is therefore an object of the invention to regulate voltages of opposite polarity and identical magnitude whose magnitude variations track each other.

It is another object of the invention to regulate voltages of opposite polarity and continuous identical magnitudes without the necessity of designing dual power supply units having identical characteristics.

SUMMARY OF THE INVENTION

Therefore, in accord with the invention, a first regulated voltage is used as a reference to control a second regulated voltage of an opposite polarity. The first regulated voltage of one polarity is regulated by a conventional first regulator circuit employing a variable impedance series regulator device between a voltage source of one polarity and the output load. A feedback comparison circuit responsive to the regulated output voltage of the one polarity and a fixed reference voltage controls the variable impedance.

The second regulated voltage of the opposite polarity is regulated by a second regulator circuit employing a variable impedance series regulator device between a voltage source of the opposite polarity and the output load. The feedback circuit controlling the variable impedance is responsive to the balance of the voltage difference between the outputs of the first and second regulators. Hence the absolute magnitudes of the two regulated voltages of opposite polarity track each other continuously.

A feature of the dual polarity voltage regulator embodying the invention is the location of the two series regulator devices controlling the two regulated voltages in the output terminal paths of each of these regulated voltages. This advantageous location of the regulator devices reduces the noise level in the respective regulated output voltages.

BRIEF DESCRIPTION OF THE DRAWING

Many additional advantages, features, and objects of the invention will be readily understood with reference to the accompanying drawing and the following detailed description. The drawing is a schematic of one embodiment of a dual polarity voltage regulator embodying the principles of the invention.

DETAILED DESCRIPTION

The dual polarity voltage regulator shown in the drawing derives a first regulated voltage of one polarity from an unregulated voltage of the same polarity. A second regulated voltage of an identical magnitude but of opposite polarity is derived from an unregulated voltage of the opposite polarity. The first regulated voltage of the one polarity is used as a reference to control the magnitude of the second regulated voltage of the opposite polarity by monitoring the voltage balance of the difference between the two voltages. The absolute magnitudes of the first and second regulated voltages are continuously identical.

The dual polarity voltage regulator comprises a positive voltage regulator 1 and a negative voltage regulator 5 responsive to changes in the output of the positive voltage regulator 1. The positive voltage regulator 1 regulates a DC voltage supplied by the battery voltage source 2. While a battery is illustrated as the source 2, it is to be understood that this source may comprise a rectified AC voltage or any other voltage source producing a substantially DC voltage. The capacitor 34, coupled across the source 2, is utilized to suppress ripple variations in the input DC voltage supplied to the voltage regulator 1. The positive regulated voltage derived from the source 2 by the voltage regulator 1 is supplied at the output lead 3. The capacitor 84 shunting the output alters the phase gain characteristic of the regulator to prevent any unstable conditions in the positive voltage regulator.

The positive regulated voltage supplied at the output lead 3 is determined by a series-regulating transistor 10 which is controlled as a variable impedance to maintain the output voltage at lead 3 at a substantially constant magnitude. If, for example, the output voltage at lead 3 increases, the impedance of the regulating transistor 10 is increased to increase the voltage drop between the source 2 and the output lead 3, and hence decrease the output voltage to its proper regulated voltage level.

The collector-emitter path of the series regulating transistor 10 is shunted by a safety circuit comprising a series connected Zener diode 14 and resistor 16. The Zener diode 14 is included to prevent the voltage across the collector-emitter path of the regulating transistor 10 from exceeding its breakdown potential. The resistor 16, in turn, limits the current flow through the Zener diode 14. The resistor 18 interconnecting the base and emitter electrodes of the regulating transistor 10 provides a leakage current path to improve its thermal stability.

Regulation in the positive voltage regulator 1 is accomplished by comparing a portion of the output voltage as sensed by a voltage divider circuit 27, comprising the resistors 28 and 29 and a potentiometer 30, with a fixed reference voltage supplied by the Zener diode 13. The potentiometer 30 advantageously permits adjustment to the voltage divider 27 to compensate for deviations in the resistive value of the resistors 28 and 29 and the zener diode 13.

The comparison is performed by a differential error detector circuit 12 which comprises two transistors 24 and 26 having their emitter electrodes connected together. The base electrode of the transistor 26 is connected to the potentiometer 30. The base electrode of the transistor 24 is connected through a resistor 15 to the Zener diode 13, which serves as the voltage reference for the positive voltage regulator 1.

If the regulated output voltage on lead 3 changes in value, this change is transmitted, via the voltage divider 27, to the base electrode of the transistor 26. The conductivity of transistor 26 is varied in response to this changed voltage. The resulting voltage change across the resistor 32 is applied to the base electrode of the amplifier transistor 11, hence altering its conductivity level. The Zener diode 21 and the resistor 22 supply a substantially constant bias voltage to the emitter electrode of amplifier transistor 11, hence the conductivity of the transistor 11 is directly proportional to the voltage at its base electrode.

The amplifier transistor 11 is coupled to the base electrode of the regulating transistor 10 and applies a control current thereto to control its collector-emitter impedance. The changed collector-emitter impedance of the series regulating transistor 10 readjusts the output voltage to its regulated value.

The negative voltage regulator 5 regulates the negative voltage supplied by the battery voltage source 6. The capacitor 69 coupled across the source 6 is utilized to reduce ripple variations in the input DC voltage supplied to the voltage regulator 5. The source 6 may comprise a battery or any suitable equivalent voltage supply. The regulated negative voltage derived therefrom is supplied at the output lead 7. The capacitor 89 shunting the output alters the phase gain characteristic of the negative regulator to prevent unstable conditions therein.

The negative voltage regulator 5 includes a stabilized transistor regulator impedance circuit 39 including the series regulating transistor 40, and the transistor 41 and Zener diode 70. The stabilized transistor regulator impedance circuit 39 permits the base collector junction of a P N P regulating transistor 40 to face the input source 6 and hence reduce the regulator sensitivity to input voltage variations. The stabilized transistor regulator impedance circuit 39 is described in detail in U.S. Pat. No. 3,334,241 by P. W. Ussery, issued Aug. 21, 1967, and is assigned to applicants' assignee. Accordingly, a detailed description of its operation is not believed necessary. The series-regulating transistor 40 serves as a controlled variable impedance to maintain the magnitude of the negative output voltage on output lead 7 at a constant regulated value.

A Zener diode 44 shunts the collector-emitter path of the regulating transistor 40 and prevents the voltage across the collector-emitter path from exceeding its breakdown voltage. The resistor 46 limits the current flow through the Zener diode 44 to a safe value. A resistor 47 is coupled to the base electrode of the regulating transistor 40 to serve as a path for leakage current.

The negative voltage regulator 5 operates in a manner similar to that of the positive voltage regulator 1. The balance of the voltage difference between the combined output voltages at both the positive and negative output leads 3 and 7 is utilized as the controlling signal to regulate the negative regulated voltage. Hence a change in the magnitude of the positive regulated voltage is continuously matched by a corresponding change in the magnitude of the negative regulated voltage.

A voltage divider circuit 57 comprising the resistors 56, 58 and the potentiometer 60 is shunted across the positive and negative output leads 3 and 7. The potentiometer 60 permits impedance adjustments to be made to the voltage divider 57 in order to compensate for variations in the values of the resistors 56 and 58.

The base electrode of transistor 52, of the differential error detector circuit 45, is connected to the potentiometer 60. The differential error detector circuit 45 includes two transistors 51 and 52. The operating range of the transistors 51 and 52 is determined in part by the voltage-regulating Zener diode 49.

The current flowing through the collector-emitter paths of transistors 51 and 52 is supplied by a constant current source 55. The constant current source 55 comprises the transistor 53 and the Zener diode 54. The constant voltage supplied by the Zener diode 54 controls the emitter bias applied to the base emitter junction of transistor 53 so that it conducts a constant current. The energization of the differential error detector circuit 45 by the constant current source 55 considerably improves its discrimination characteristics and hence its sensitivity to small voltage changes.

The operation of the negative voltage regulator 5 will be described herein in terms of its response to an increase in the magnitude of the regulated voltage output of the positive voltage regulator 1. An increase in the magnitude of the positive regulated voltage alters the balance of the voltage difference between the output leads 3 and 7. Hence an increased positive voltage level is applied, via the voltage divider 57, to the base electrode of the transistor 52 of the differential error detector circuit 45. The transistor 52 in response to this increased positive voltage is biased into a higher conductive condition hence drawing a larger current from the current source 55.

Since the total current flow to the transistors 51 and 52 is constant, the increase in the current in transistor 52 is matched by a corresponding decrease in the current in transistor 51. Due to this decrease in current flow in the transistor 51, the voltage bias at the base electrode of the transistor 42 is increased in a positive direction. The operating range of transistor 42 is determined by the voltage-regulating Zener diode 99 coupled to its emitter electrode. The conductivity of transistor 42 is hence decreased and in turn lowers the potential at the base electrode of the transistor 41 of the stabilized transistor regulator impedance circuit 39. The current flow in the transistor 41 is increased which in turn increases the base current in the series-regulating transistor 40. A more comprehensive discussion of the operation of the stabilized transistor regulator impedance circuit 39 may be found in the aforementioned U.S. Pat. No. 3,334,241.

The increase in the base current of the series-regulating transistor 40 increases its conductivity thereby lowering its collector-emitter impedance sufficiently to increase the magnitude of the negative regulated voltage by an amount equal to the magnitude of the increase in the positive regulated voltage.

If the regulated voltage output of the positive voltage regulator 1 should decrease in magnitude the differential error detector circuit 45 responds to increase the collector-emitter impedance in the series-regulating transistor 40. This increased impedance in the regulating transistor 40 increases the voltage drop between the source 6 and output lead 7 hence decreasing the magnitude of the negative regulated voltage. It is apparent from the foregoing that the absolute magnitude of the negative regulated voltage continuously tracks the absolute magnitude of the positive regulated voltage.

While the above invention has been described with respect to a particular embodiment, many variations and modifications may be made to the dual polarity voltage regulator without departing from the spirit and scope of the invention.

We claim:

1. A multioutput voltage regulator supplying at least two regulated voltages of identical magnitude and opposite polarity comprising a first voltage regulation means to supply a first regulated voltage of one polarity including a first series-regulating device, a second voltage regulation means to supply a second regulated voltage of a polarity opposite to said one polarity, said second voltage regulation means comprising a second series voltage-regulating device and error-detecting means responsive to the voltage balance of said first and second regulated voltages, said error-detecting means comprising a voltage divider shunted across respective output terminals of said first and second voltage regulation means and a differential error detector circuit coupled to said voltage divider, said differential error detector circuit responding to deviations from said voltage balance as detected through said voltage divider and in response thereto altering the regulation in said series voltage regulator control means, and said first and second series voltage-regulating devices being located in a direct path interconnecting a first and a second unregulated source to a first and second regulated output terminal of said first and second voltage regulation means, respectively.

2. A dual voltage regulator to regulate two sources of unregulated voltages of opposite polarities, comprising a first series regulator to regulate a voltage of one polarity, a second series regulator to regulate a voltage of an opposite polarity, a first voltage error detector coupled to said voltage of one polarity to control said first series regulator, a second voltage error detector coupled to said voltage of one polarity and said voltage of the opposite polarity to control said second series regulator, said second error detector comprising a voltage divider circuit shunted across the regulated voltage of one polarity and the regulated voltage of the opposite polarity, a differential error detector circuit having its control input coupled to said voltage divider, a reference signal source comprising a constant current source coupled to said differential error detector, and means to utilize said differential error detector circuit to direct controlled amounts of the current output of said constant current source to control the impedance of said second series regulator, whereby the absolute magnitude of said voltage of an opposite polarity is maintained equal to the absolute magnitude of said voltage of one polarity.

3. A dual voltage regulator as defined in claim 2 wherein said first and second series regulator are directly interposed between said two sources of unregulated voltages of opposite polarity and said first and second regulated voltages of opposite polarities, respectively.

4. A dual voltage regulator supplying a first regulated voltage output of one polarity and a second regulated voltage output of an opposite polarity comprising a first series regulator with a first controllable impedance, a second series regulator with a second controllable impedance, a first error detector responsive to voltage variations in said first regulated voltage output and controlling said first controllable impedance and a second error detector responsive to variations in a voltage balance of the voltage difference between said first regulated voltage output and said second regulated voltage output, said second error detector including a constant current source, and utilizing controlled proportional amounts of current supplied by said constant current source to vary the impedance of the second controllable impedance of said second series regulator in response to deviations in the balance of said voltage balance, whereby the absolute magnitude of the voltage output of said second regulated voltage output is maintained continuously identical to the absolute magnitude of the voltage output of said first regulated voltage output.

UNITED STATES PATENT OFFICE
CERTIFICATE OF CORRECTION

Patent No. 3,571,604                     Dated March 23, 1971

Inventor(s) Frank C. La Porta     Paul W. Ussery

It is certified that error appears in the above-identified patent and that said Letters Patent are hereby corrected as shown below:

In the title page Item 72, the first inventor's name should appear as Frank C. La Porta.

Signed and sealed this 7th day of September 1971.

(SEAL)
Attest:

EDWARD M. FLETCHER, JR.          ROBERT GOTTSCHALK
Attesting Officer                Acting Commissioner of Pate